Patented Oct. 17, 1950

2,525,771

UNITED STATES PATENT OFFICE 2,525,771

FATTY ACID-ALIPHATIC AMINE POLYGLYCOL COMBINATIONS USEFUL AS TEXTILE ASSISTANTS AND PROCESS OF PRODUCING THE SAME

Alton A. Cook, Glen Ridge, and Irving Wolf, West New York, N. J., assignors to Arkansas Company, Inc., Newark, N. J., a corporation of New York No Drawing. Application May 12, 1947, Serial No. 747,599

9 Claims. (Cl. 260—404.5)

The present invention relates to textile processing chemicals and methods of making the same, and it particularly relates to such materials having particular utility as softening and finishing agents.

It is among the objects of the present invention to provide improved finishing and softening agents for textile fabrics.

Still further objects and advantages will appear in the more detailed description set forth below, it being understood, however, that this more detailed description is given by way of illustration and explanation only and not by way of limitation, since various changes may be made therein by those skilled in the art without departing from the scope and spirit of the present invention.

In accomplishing the above objects, it has been found most satisfactory to combine a fatty monocarboxylic acid having 12 to 24 carbon atoms first with a water-soluble primary or secondary aliphatic amine having at least two amino groups or one amino group and one or more hydroxyl groups. Then the resulting product is combined with a polyethylene glycol of an average molecular weight ranging from 200 to 1500.

The first step is preferably carried out at a temperature of 165° C. and 205° C. for 1 to 2 hours, while the second step is carried out at a temperature 15° C. to 30° C. lower, as, for example, at 150° C. to 175° C. for about one hour.

The amine should be present in at least equimolal proportions and desirably from 1 to 1½ mols of amine are used for each mol of fatty acid. The first-step of the reaction normally is carried out until an acid number of 6 to 20 has been reached.

In the second step the polyethylene glycol is added in an amount ranging from $\frac{1}{10}$ to 1 mol, depending upon the molecular weight. For example, with a molecular weight of 200, about 1 mol of polyethylene glycol is used for each mol of fatty acid, while with a molecular weight of 400 about ½ mol is employed, while with a molecular weight of 1500 about $\frac{1}{10}$ mol is employed.

The second-step reaction is stopped when an acid number of 2 or below is attained.

The final product is highly complex and includes esters, amides and amino-esters. There are usually small quantities of free polyethylene glycol in the final composition.

The product may be neutralized or acidified with lower aliphatic acids such as formic or acetic.

It may also be alkylated with methyl iodide, diethyl or dimethyl sulphate, preferably in alkaline media at 100° C., with or without solvents, such as ethyl alcohol, being present.

When used as a softener or finishing agent in the finishing of cotton or rayon goods or in the treatment of leather, the complex of the present invention is employed in the amount of from 2% of the weight of the material being processed up to 10% and in aqueous concentrations of $\frac{1}{10}$% to 1% at temperatures up to 100° C. and at a pH of 3 to 8.

It has been found in the present invention that where these two types of reactions are carried out by a definite succession of steps as described above by first combining the fatty acid and aliphatic amine and then the polyethylene glycol, products are obtained which have properties which would not be expected from a physical mixture of an amino fatty acid condensation product and a polyethylene glycol-fatty acid ester as is ordinarily known.

The ingredients used in this invention fall into three classes of compound and at least one compound of each class is necessary to the manufacture of the products described herein.

*Class 1.*—Water-soluble aliphatic saturated polyalcohol having at least four carbon atoms and at least 2 hydroxyl groups and a melting point preferably under 100° C.

Examples:

Polyethylene glycols of various average molecular weights from 200 to 1500.

*Class 2.*—Water-soluble aliphatic saturated amines with two or more amino groups or one amino group and one or more hydroxyl groups, excluding tertiary amines.

Examples:
    Ethylene diamine; diethylenetriamine; triethylenetetramine; tetraethylenepentamine; mono- and diethanolamines; mono- and di-propanolamines; butyl-mono- and di-ethanolamine; 2-methyl, 2-amino, 1-propanol; and aminoethylethanolamine.

The tertiary amines do not produce satisfactory finishing agents, as contrasted to the primary and secondary amines.

Class 3.—Mono-carboxylic fatty acids having from 12 to 24 carbon atoms. The saturated fatty acids $C_{12}$ to $C_{18}$ are preferred, but the unsaturated and hydroxylated types may be used. This includes mixed fatty acids obtained from splitting natural oils and fats.

Example:
    Lauric, myristic, palmitic and stearic acids are preferred. Oleic, ricinoleic, erucic, and mixed fatty acids from coconut or palm oil, tallow, and Japan wax may also be used.

As the first step in making finishing or softening agents, one mol of fatty acid and 1 to 1½ mols of aliphatic amine are heated at 165° C. to 210° C. for 1 to 2 hours, until such time as the acid number is 6 to 20.

As a second step, the temperature of the mixture is then lowered 15 to 30 degrees C. Then $\frac{1}{10}$ to 1 mol of a polyethylene glycol of 200 to 1500 molecular weight is added and the heating continued in the range of 150° C. to 175° C. for about one hour or until such time as the acid number is 2 or below.

The products made by this process are viscous liquids or waxy solids, which may be diluted with water to form either clear fluid solutions or soft pastes and may be adjusted to a lower pH with acids if desired. For example, an organic acid, preferably acetic or formic, is added to adjust the product to neutral or slightly acid pH for optinum results as softening agents.

To give several examples (all parts by weight):

Example I 284 parts of stearic acid are condensed with 105 parts of diethanolamine at 180° C. to 190° C. for 1 hour to an acid number of 10–15 and then with 200 parts of a polyethylene glycol having an average molecular weight of 200 at 165° C. to 175° C. for one hour or until the acid number is below 2. The reaction mixture is allowed to cool and the resulting product is a homogeneous, light-tan product of waxy consistency. This product may be dispersed in water with or without acidification to yield colloidal solutions which are useful in the softening of textile materials.

Example II 228 parts of myristic acid are condensed with 146 parts of triethylene tetramine at 165° C. to 175° C. for 1½ hours to an acid number of 8 to 12 and then with 250 parts of a polyethylene glycol having an average molecular weight of 400 at about 150° C. to 155° C. for about 1 hour or until the acid number is 2 or below. During this time, the mixture is continuously stirred and all water which is formed as a product of the reaction is permitted to escape. After cooling to room temperature, the resulting product consists of a soft, yellow paste which may be dispersed in water and used in the finishing of cellulosic textiles.

Example III 210 parts of coconut fatty acids are mixed with 61 parts of monoethanolamine. This mixture is heated with agitation to 190° C. and held at this temperature for about 2 hours or until the acid number is 15 to 20. The resulting condensate is permitted to cool to about 160° C. Then 150 parts of a polyethylene glycol having an average molecular weight of 200 are added with constant stirring. The temperature of 160° C. is maintained for about 1 hour to reach an acid number of 2 or less and the product is allowed to cool to room temperature.

The resulting product is a brownish, thick paste which is readily dissolved in water and is useful as a textile softener and surface active agent.

Example IV

A mixture of 256 parts of palmitic acid and 104 parts of aminoethylethanolamine is heated at 200° C. for about 1 hour or until the acid number has been reduced to approximately 6. The reaction mass is cooled slowly to 170° C. and 100 parts of a polyethylene glycol having an average molecular weight of 400 are added over a 10-minute period and the temperature maintained for about ¾ of an hour to obtain an acid number below 2. After cooling, the resulting product is a brown paste useful as a finishing and softening agent.

Example V 265 parts of palm oil fatty acids and 330 parts of tetraethylene pentamine are mixed together and heated with constant stirring at 180° C. to 190° C. for 1 to 2 hours or until such time as the acid number of the mixture is reduced to 5 to 10. The temperature is then lowered to 160° C. to 165° C. and 150 parts of a polyethylene glycol mixture having an average molecular weight of 1,500 are added and the heating continued for about 1 hour or until the acid number has been reduced to less than 2.

The resulting product consists of a viscous, yellow liquid which has marked emulsifying properties and is useful as a softening agent in finishing cellulosic fabrics.

Example VI 105 parts of diethanolamine are mixed with 210 parts of lauric acid and heated at 170° C. to 180° C. for about an hour. The mixture is then cooled to 155° C. to 160° C. and 200 parts of a polyethylene glycol having an average molecular weight of 400 are added. The heating is continued for another hour, or until the acid number of the mixture is 2 or below.

The resulting product is a clear, dark-amber liquid which has been found to be an efficient softening and wetting agent and of value in the wet processing of textile materials.

In the above process, the first step generally consists of heating a fatty acid and a water-soluble aliphatic primary or secondary amine at a temperature in the range of 165° C. to 210° C., while the second step consists in lowering the temperature to a range of 150° C. to 175° C., adding a polyethylene glycol, and continuing the heating until the acid number is very low. In general, the products produced by this process are softeners useful for the finishing of cellulosic fabrics, and some of them also have emulsifying and wetting properties.

The temperature of 165° C. to 210° C. for the first step, combined with a temperature of between 150° C. and 175° C. in the second step is quite vital.

The following table summarizes the above examples:

| Example and fatty acid | Amine | Polyalcohol, molecular weight | Time and temperature | | Properties |
| --- | --- | --- | --- | --- | --- |
| | | | First step | Second step | |
| I. Stearic, 1 mol | Diethanolamine, 1 mol | 200, 1 mol | 180° C.–190° C., 1 hr. | 165° C.–175° C., 1 hr. | Softener. |
| II. Myristic, 1 mol | Triethylenetetramine, 1 mol | 400, ½ mol | 165° C.–175° C., 1½ hrs. | 150° C.–155° C., 1 hr. | Do. |
| III. Coconut, 1 mol | Monoethanolamine, 1 mol | 200, ¾ mol | 185° C.–195° C., 2 hrs. | 155° C.–165° C., 1 hr. | Softener, Wetting Agent. |
| IV. Palmitic, 1 mol | Aminoethylethanolamine, 1 mol. | 400, ¼ mol | 195° C.–205° C., 1 hr. | 165° C.–175° C., 1 hr. | Softener. |
| V. Palm Oil, 1 mol | Tetraethylenepentamine, 1½ mol. | 1,500, ⅒ mol | 180° C.–190° C., 1–2 hrs. | 160° C.–165° C., 1 hr. | Softener, Emulsifying Agent. |
| VI. Lauric, 1 mol | Diethanolamine, 1 mol | 400, ½ mol | 170° C.–180° C., 1 hr. | 155° C.–160° C., 1 hr. | Softener, Wetting Agent. |

The finishing and softening agents as above described do not affect shades or light fastness of dyes to the same extent that ordinary cationic finishes do. Furthermore they may be used at wide pH ranges (3 to 9) in acid, neutral and slightly alkaline baths.

Since certain changes may be made in the above textile processing chemicals and methods of making the same, and different embodiments of the invention could be made without departing from the scope thereof, it is intended that all matter contained in the above description shall be interpreted as illustrative and not in a limiting sense.

What is claimed is:

1. A process of making a textile softener which comprises combining a high molecular weight fatty acid having 12 to 24 carbon atoms with a water soluble saturated aliphatic amine at about 165° C. to 205° C. for about 1 to 2 hours and then with a polyethylene glycol having an average molecular weight ranging from 200 to 1500 at about 150° C. to 175° C. for about one hour.

2. A process of making a textile softener which comprises combining a high molecular weight fatty acid having 12 to 24 carbon atoms with a water soluble saturated alkanolamine at about 165° C. to 205° C. for about 1 to 2 hours and then with a polyethylene glycol having an average molecular weight ranging from 200 to 1500 at about 150° C. to 175° C. for about one hour.

3. A process of making a textile softener which comprises combining a high molecular weight fatty acid having 12 to 24 carbon atoms with a water soluble saturated polyalkaline polyamine at about 165° C. to 205° C. for about 1 to 2 hours and then with a polyethylene glycol having an average molecular weight ranging from 200 to 1500 at about 150° C. to 175° C. for about one hour.

4. A process of making a textile softener which comprises combining a high molecular weight fatty acid having 12 to 24 carbon atoms with a water soluble saturated aliphatic amine at about 165° C. to 205° C. for about 1 to 2 hours and then with a polyethylene glycol having an average molecular weight ranging from 200 to 1500 at about 150° C. to 175° C. for about one hour and then neutralizing with a low molecular weight fatty acid.

5. A process of making a textile softener which comprises combining about one mol of stearic acid with about one mol of diethanolamine at about 180° C. to 190° C. for about one hour and then with about one mol of a polyethylene glycol having a molecular weight of about 200 at about 165° C. to 175° for about one hour.

6. A process of making a textile softener which comprises combining a high molecular weight fatty acid having 12 to 24 carbon atoms with a water soluble saturated aliphatic amine at about 165° C. to 205° C. until the acid number drops to between 6 and 20 and then with a polyethylene glycol having an average molecular weight ranging from 200 to 1500 at about 150° C. to 175° C. until the acid number drops to not over 2.

7. A process of making a textile softener which comprises heating about one mol of a high molecular weight fatty acid having 12 to 24 carbon atoms with about 1 to 1½ mols of a water soluble saturated aliphatic amine at about 165° C. to 205° C. for about 1 to 2 hours and then with between about ₁/₆ mol and 1 mol of a polyethylene glycol having a molecular weight of between about 200 to 1500 at about 150° C. to 175° C. for about one hour.

8. A textile softener consisting of a combination of a polyethylene glycol with a combination of a water-soluble saturated aliphatic amine and a high molecular weight fatty acid having 12 to 24 carbon atoms produced according to the process of claim 1.

9. A textile softener consisting of a combination of a polyethylene glycol with a combination of a water-soluble saturated aliphatic amine and a high molecular weight fatty acid having 12 to 24 carbon atoms produced according to the process of claim 7.

ALTON A. COOK.
IRVING WOLF.

REFERENCES CITED

The following references are of record in the file of this patent:

UNITED STATES PATENTS

| Number | Name | Date |
| --- | --- | --- |
| 1,875,312 | Youtz | Aug. 30, 1930 |
| 2,231,754 | De Groote et al. | Feb. 11, 1941 |
| 2,361,185 | Engelmann et al. | Oct. 24, 1944 |